United States Patent [19]

Nicholson

[11] 4,114,908

[45] Sep. 19, 1978

[54] METAL SEALS OR GASKETS

[76] Inventor: Terence Peter Nicholson, Calf Hall, Muggleswick, Derwentside, Durham, England

[21] Appl. No.: 791,250

[22] Filed: Apr. 27, 1977

[51] Int. Cl.² .............................................. F16J 15/06
[52] U.S. Cl. ...................................... 277/211; 277/166
[58] Field of Search ................ 277/165, 235 B, 206.1, 277/166, 228, 206, 211

[56] References Cited

U.S. PATENT DOCUMENTS

| | | | |
|---|---|---|---|
| 2,307,440 | 1/1943 | Wilson | 277/211 |
| 2,543,963 | 3/1951 | Gaffin | 277/211 |
| 3,098,660 | 7/1963 | Hausner | 277/206.1 |
| 3,167,320 | 1/1965 | Kyle | 277/211 |
| 3,481,613 | 12/1969 | Hathaway | 277/206.1 |
| 3,664,676 | 5/1972 | Peterson | 277/235 B |
| 3,836,183 | 9/1974 | Battle | 277/211 |

FOREIGN PATENT DOCUMENTS

| | | | |
|---|---|---|---|
| 679,948 | 8/1939 | Fed. Rep. of Germany | 277/211 |
| 522,024 | 6/1940 | United Kingdom | 277/165 |

Primary Examiner—Robert I. Smith

[57] ABSTRACT

A metal gasket for making a fluid tight sealed joint between opposed parallel surfaces has a radially inward part and a radially outward part each formed with a peripheral groove; also at least one of the end faces of the gasket is formed with annular grooves of substantially rectangular profile in radial planes. Thereby there is provided a compressible yet resilient gasket which can satsifactorily be used to form a fluid tight joint.

8 Claims, 5 Drawing Figures

METAL SEALS OR GASKETS

This invention relates to metal seals, — hereinafter referred to as gaskets, — for making fluid tight sealed joints between opposed parallel surfaces. Examples of such surfaces are pipe flanges, valve covers and so forth where it is virtually necessary to fit the gasket into a recess machined into one or each of the surfaces or alternatively to use in addition a compression control ring.

A desirable attribute of such a gasket is that it should have a degree of resilience such that when released from a predetermined compressive force it returns to a considerable extent towards its original dimension. Unfortunately however this resilience tends to reduce the surface pressure or compressive load on the upper and lower surfaces of the gasket to the extent that it becomes insufficient to cause deformation of the gasket into surface irregularities of the opposed surfaces especially when these have very rough machine finishes.

The present invention has been devised with the general object of providing a compressible yet resilient metal gasket which can satisfactorily be used to form a fluid tight joint between opposed surfaces having irregularities therein. A subsidiary object is to provide a satisfactory alternative to known spirally wound gaskets which cause both indentation and corrosion of faces which they seal, and also an alternative to larger diameter metal 'O' rings.

Thus in accordance with the invention a metal gasket is characterised firstly in that its radially inward part and its radially outward part is each formed with a peripheral groove and secondly in that at least one if its end face is formed with annular grooves of substantially rectangular profile in radial planes.

Additionally, and particularly when the radial dimension of the gasket is relatively large in comparison with the gasket thickness, it may be formed with one or more annular cavities which open into one or other of the grooved ends of the gasket.

Examples of gaskets constructed according to the invention are illustrated in the accompanying drawings in which.

Figure 1:
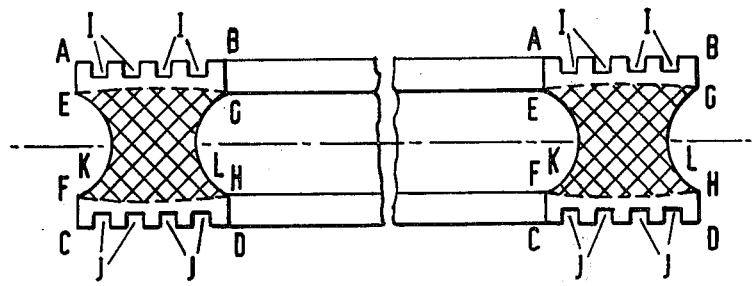
FIG. 1 is a cross-sectional view of one form of gasket.

Referring now to FIG. 1 the annular gasket there shown is mainly intended for use in the sealing of joints between flanges defining relatively small bores. It is of circular annular shape and may be said to comprise a central somewhat resilient solid body part E K F H L G shown cross-hatched and of which the machined parts GLH and EKF respectively constitute radially inner and radially outer grooves.

Figure 2:
FIG. 2 shows the gasket of FIG. 1 housed in a recess in one of a pair of flanges which are to be drawn together to form a fluid-tight seal.
Figure 3:
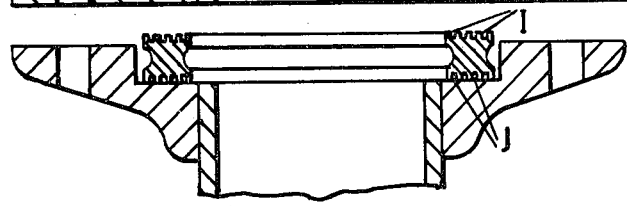
FIG. 3 shows the mode of use of the gasket of FIG. 1 with a nip control ring.

The upper body part AEBG and the lower body part FCDH are each formed with a series of annular end face grooves I and J of rectangular profile. The effect of these grooves is that the compressive load is concentrated into less than 50% of the total seal surface area and this has the result that when a compressive load is applied the parts of the gasket which separate the grooves can flow into irregularities of the opposed surfaces to be sealed in order to ensure a perfect seal. It is to be understood that these grooves in the sealing surfaces can be formed by machining or etching. Typical modes of installation of the FIG. 1 gasket are shown in FIGS. 2 and 3, the surrounding ring S in FIG. 3 being a nip control ring.

It is generally accepted that increases in bore size in a member should be matched by increases in the radial width of a flange or other part surrounding the bore and this applies also to a sealing gasket intended to be interposed between two such members. Moreover when high pressures are likely to be developed in such a bore a still further increased radial width is usually required. However if the radial width of a gasket such as has been described with reference to FIGS. 1 to 3 is increased substantially it loses its resilience.

Figure 4:
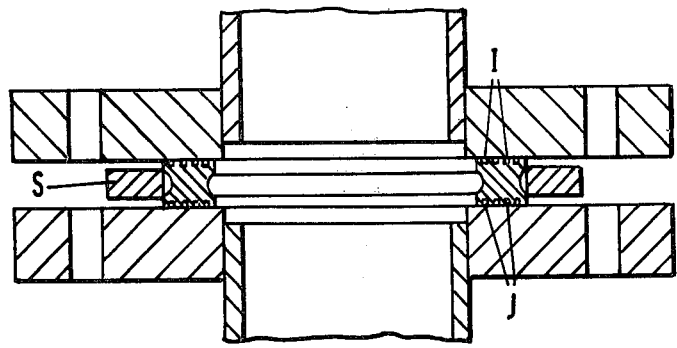
FIG. 4 is a cross-section of another form of gasket.

For such applications therefore, the gasket is modified somewhat as indicated in FIG. 4. This embodiment may be regarded as an aggregation of two or more concentric rings as shown in FIG. 1 such as to provide a plurality of annular cavities T which open into one or other of the gasket end faces between groups of rectangular profile annular grooves therein.

Although gaskets or seals according to the invention will most usually have the shape of a circular ring and have a circular central aperture it is to be understood that they may be otherwise shaped to suit more than one such aperture of circular, oval, triangular, rectangular or any other shape. Although circular seals could be machined from solid material, it is much more economical if they are fabricated from solid drawn or rolled material of the correct section and the ends either butt welded or brazed together. A variety of materials may be used and selected to suit any particular condition.

Figure 5:
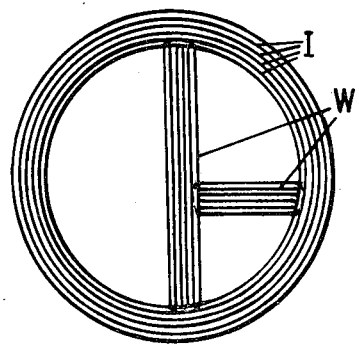
FIG. 5 is a general view of a third form of gasket intended for use in a heat exchanger.

The gaskets have a particular suitability for use with single or multiple aperture heat exchangers. FIG. 5 is an end view of a typical heat exchanger gasket constructed as above described with reference to FIGS. 1 and 2 but with the addition of welded or brazed-on cross-bars W for reinforcement purposes. When these are manufactured from metal they can be faced generally by electro-deposition with metal such as silver, indium, gold, nickel and so forth or even with a synthetic rubber should the characteristics of the application so demand.

Gaskets as described may be said to function not only as a pressure seal but also as a labyrinth seal. Thus if for some reason there was a deep depression across one of the two surfaces which the inerposed gasket had not quite filled there would be a pressure drop across each of its face grooves resulting in a leak tight seal.

I claim:

1. An annular metal gasket for making a fluid-tight sealed joint between axially opposed parallel surfaces, said gasket having a radially inner face formed with a peripheral groove, a radially outward face formed with a peripheral groove and axial end faces intended respectively to engage said opposed parallel surfaces, at least one of said end faces being formed with concentric annular grooves, each of said grooves having a substantially rectangular profile taken in a radial plane.

2. A metal gasket as claimed in claim 1 having at least one annular cavity extending axially between the radially inner and outer faces and which opens into one of the grooved axial end faces of the gasket.

3. A metal gasket as claimed in claim 2 in which the cavity has a T-shaped radial profile.

4. A metal gasket as claimed in claim 1 having cross bars secured thereto for reinforcement purposes.

5. A composite metal gasket formed of a plurality of substantially coplanar concentric annular gaskets each formed in accordance with claim 1.

6. A composite metal gasket according to claim 5 including radially extending connecting members integral with concentrially adjacent ones of said annular gaskets.

7. The annular metal gasket according to claim 1 wherein said end face having the concentric annular grooves has a total sealing surface less than 50% of the area of the end face.

8. The annular metal gasket according to claim 1 formed of a compressible metal.

* * * * *